United States Patent

[11] 3,591,711

[72] Inventor Paul H. De Groat
Webster, N.Y.

[21] Appl. No. 553,175
[22] Filed May 26, 1966
[45] Patented July 6, 1971
[73] Assignee Xerox Corporation
Rochester, N.Y.

[54] LANDLINE FACSIMILE SYSTEM
6 Claims, 5 Drawing Figs.

[52] U.S. Cl. .......... 178/6, 179/2 DP, 325/65, 325/145, 325/163, 328/150
[51] Int. Cl. .......... H04n 5/40
[50] Field of Search .......... 325/65, 148, 152, 153, 163, 145, 46; 307/264, 271, 237; 328/150, 168; 179/2 DP; 178/6.6, 6

[56] References Cited

UNITED STATES PATENTS

| | | | |
|---|---|---|---|
| 3,436,487 | 4/1969 | Blane | 179/2 DP |
| 2,398,055 | 4/1946 | Shepherd | 179/2 DP |
| 2,881,251 | 4/1959 | Strip | 179/2 DP |
| 3,258,694 | 6/1966 | Shepherd | 325/145 |
| 3,288,930 | 11/1966 | Johnson | 178/6 |
| 3,289,083 | 11/1966 | Barr | 179/2 DP |
| 3,340.364 | 9/1967 | Brightman | 179/2 DP |
| 3,392,232 | 7/1968 | Cohen | 178/6 |
| 1,885,826 | 11/1932 | Holden | 178/6 FM |
| 2,350,051 | 5/1944 | Lubeck | 178/6 FM |
| 2,366,363 | 1/1945 | Shonnard | 178/6 FM |
| 2,411,853 | 12/1946 | Finch | 178/6 FM |
| 2,430,978 | 11/1947 | Foster | 325/46 |
| 3,111,635 | 11/1963 | Skov | 325/46 |

*Primary Examiner*—Robert L. Griffin
*Assistant Examiner*—Joseph A. Orsino, Jr.
*Attorneys*—James J. Ralabate, Norman E. Schrader and Ronald Zibelli ABSTRACT: A skip frequency circuit for selectively excluding from the signal spectrum thereof any tonal frequency signals which fall within a predetermined forbidden band in the transmission network of a facsimile system. The forbidden bands would be defined by those control frequencies employed in the landline telephone transmission facilities over which the facsimile system is to operate. In response to the detection of signals within a forbidden zone, a skip or jump is automatically initiated, thus shifting the facsimile video signals to another level thereby avoiding the generation of signal frequencies within a predetermined forbidden frequency zone.

INVENTOR.
PAUL H. DE GROAT
BY
ATTORNEYS

INVENTOR.
PAUL H. DE GROAT

BY

ATTORNEYS

LANDLINE FACSIMILE SYSTEM

This invention relates to graphic communication apparatus and more particularly to improved, versatile facsimile apparatus operable over standard telephone facilities.

In many aspects of the business world it is often desirable to rapidly and economically transmit graphic information between one or more remote points and a central point. For example, in the business community it is often advantageous for a salesman to be able to efficiently and economically transmit orders to the central office for acceptance and/or filment. Additionally in the newspaper business it is often desirable for reporters to be able to quickly and completely dispatch graphic information to the main office for processing. The use of two way radios and telephones while extremely advantageous in obtaining rapid communications have not offered a complete solution for unaided they are unable to transmit graphic information effectively.

Facsimile systems are well known in the art in which a transmitter converts information on a document through, for example, an electro-optical scanning system, into electrical signals suitable for transmission over wire or radio communication networks. At the facsimile receiver the electrical signals in conjunction with suitable synchronizing signals control the marking apparatus which in response to the received electrical signals recreates a facsimile or copy of the original document.

While prior art facsimile systems similar to that broadly described above have been found useful providing a method of graphic communication between remote points they have not found widespread use in the business community because of the several inherent limitations. One of the principal limitations has been the availability of low cost communication networks suitable for the transmission of facsimile signals. With the introduction of the Xerox-Magnafax Telecopier the problem of low cost, readily available transmission media for facsimile signals has been significantly minimized. The Xerox-Magnafax Telecopier, which is commercially available from the Xerox Corporation, provides an inexpensive, lightweight facsimile transceiver that may be employed for transmitting and receiving facsimile signals over standard telephone transmission lines.

With the advent of mass communications including vast, globe encircling satellites and transoceanic cable telephone networks it is possible to establish telephone communication circuits between nearly any two cities in the world. Thus by employing the hereinbefore described Xerox-Magnafax Telecopier it would be possible to transmit graphic information between any two telephone terminals which may be interconnected through the telephone communication networks. While such international telephone links have been useful in establishing voice communications they have not been totally satisfactory for facsimile transmission systems primarily because of the nonstandardized forbidden signaling frequency zones which are employed in the various telephone systems for various control functions. For example, while in the United States a facsimile system employing a signal frequency spectrum from 1500 to approximately 2475 hertz for the grey scale facsimile levels from white to black may be operated over the telephone lines such a signal spectrum would be inoperable over the British or French telephone network lines. Such a system would be inoperable over the British and French lines because the signal spectrum would conflict with the control signals employed in trunk signaling equipment which is responsive to signals in the vicinity of 2280 and 2000 hertz respectively. Similarly the stop tone which indicates the end of transmission must be compatible with the permissible frequency spectrum of the respective telephone systems.

It is therefore an object of the present invention to provide methods and apparatus for selectively avoiding predetermined signal frequencies within forbidden zones of telephone facsimile communication systems.

It is a further object of the present invention to increase the compatibility of landline facsimile apparatus with various and diverse frequency signaling requirements.

It is a further object of the present invention to selectively exclude facsimile signals from forbidden frequency zones of landline telephone circuits.

It is yet another object of the present invention to improve graphic communication over landline telephone systems.

It is a still further object of the present invention to expand the useability of conventional telephone lines for transmission of facsimile signals.

In accomplishing the above and other desirable objects Applicant has invented a novel method and improved apparatus for detecting and selectively excluding from the transmitted facsimile signal spectrum any tonal signals which fall within a predetermined forbidden signal frequency zone. In accordance with the preferred embodiment of the present invention, the facsimile video signals from a scanner which would normally fall within a predetermined forbidden frequency zone for a particular telephone network are recognized on a voltage basis. In response to the detection of signals within a forbidden zone, a skip or jump is automatically initiated thus shifting the facsimile video signals to another level thereby avoiding the generation of signal frequencies within a predetermined forbidden frequency zone.

For a more complete understanding of Applicant's invention reference may be had to the following detailed description in conjunction with the drawings in which.

Figure 1:
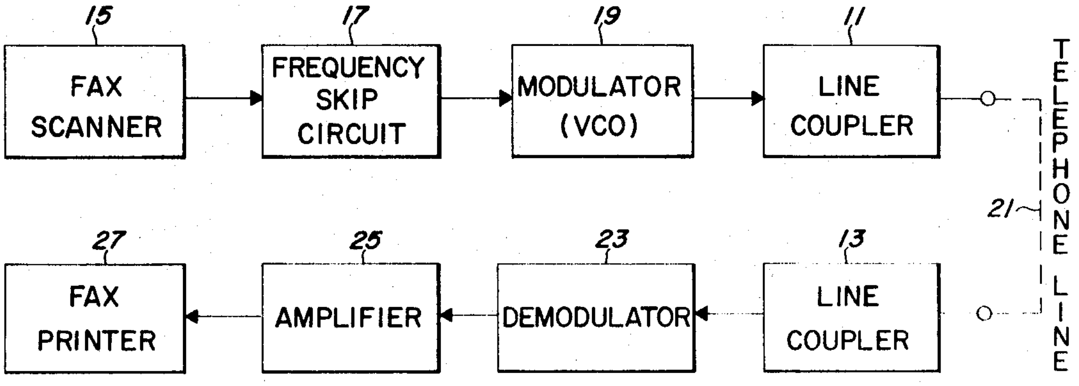
FIG. 1 is a block diagram of a facsimile system embodying the principles of the present invention.

Referring to FIG. 1 there is shown a block diagram of a facsimile system embodying the principles of the present invention which is operable over conventional telephone lines. In operation after an initial connection has been established, for example, by dialing the desired telephone number, the handset at the transmitting and receiving stations would be deposited in the acoustic line couplers 11 and 13 at the transmitting and receiving stations respectively. Other types of couplers would, of course, be operable. A document to be transmitted would be advanced past a scanning station of facsimile scanner 15 whereby, in accordance with known principles, the information on the document would be converted into suitable electrical video signals, for example, by means of an electro-optical scanning apparatus. The signals emanating from the facsimile scanner 15 are coupled to a frequency skip circuit 17 which, as hereinafter will be more fully explained selectively excludes or prevents the generation of facsimile signals which would fall within a predetermined forbidden frequency range or zone.

In response to signals from the facsimile scanner, modulator 19, which may comprise a voltage controlled oscillator, selectively generates appropriate tonal signals for transmission over the telephone line 21. The output of the modulator 19 is coupled to acoustic coupler 11 wherein, in the transmitting mode, a speaker would be selectively energized to couple acoustic tonal facsimile signals and appropriate phasing and synchronizing signals to the mouthpiece of the transmitting telephone. From the mouthpiece of the telephone the signals are transmitted via the telephone line 21 to the earpiece of the receiving telephone.

From the earpiece of the receiving telephone the facsimile signals are coupled from line coupler 13 to a demodulator circuit 23. The output signals from the demodulator 23 are coupled to amplifier 25 which generates appropriate signals for driving the facsimile printer 27. Thus in response to the scanning of facsimile document at the transmitter a facsimile or copy is reproduced at the facsimile printer.

The majority of the various circuit components or subassemblies of the facsimile system shown in FIG. 1 form no part of the present invention and therefore need not be explained in detail. Any facsimile apparatus known in the art for converting information on a document into tonal signals by means of a controllable oscillator may be employed in conjunction with the skip frequency circuit embodying the principles of the present invention. For a more complete understanding of the structure and operation of illustrative facsimile apparatus which may be employed, in the embodiment shown in FIG. 1, reference may be had to the following copending applications which are herewith incorporated herein by reference: "Facsimile System," Ser. No. 176,248, filed Feb. 28, 1962, now abandoned in the name of Glenn E. Reese et al., and "Facsimile Transmission Systems," Ser. No. 458,954 now abandoned filed May 26, 1965, in the name of R. J. Crookshanks et al.

Figure 2:
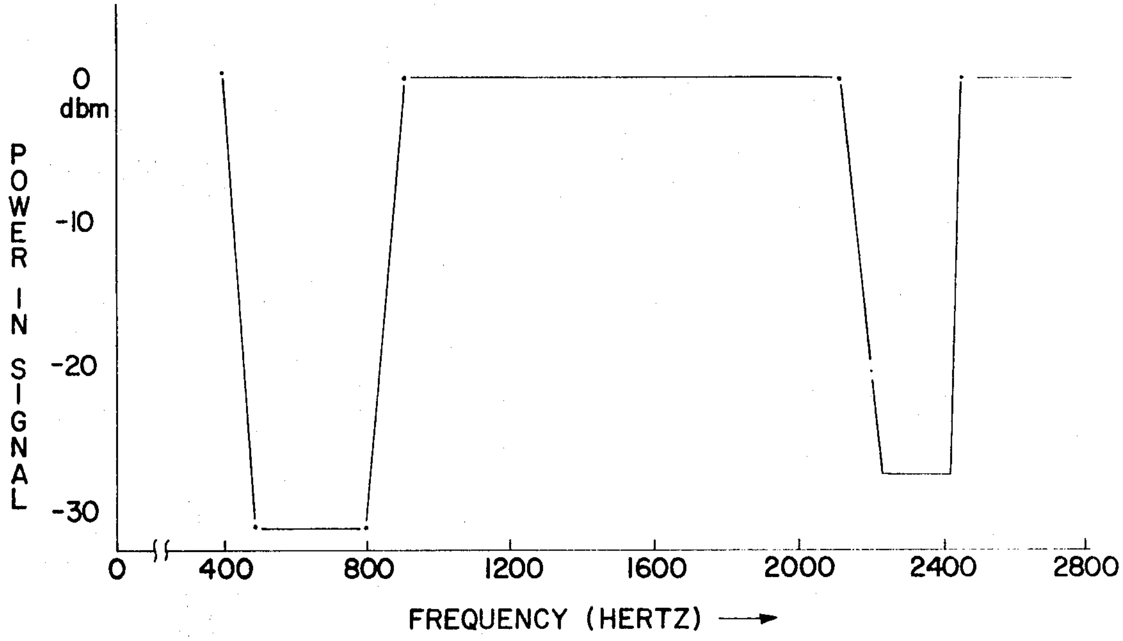
FIG. 2 is a plot of signal power versus frequency which is useful in understanding the forbidden signal frequency zones of a typical telephone system.

Referring now to FIG. 2 there is shown a plot of allowable data signal power versus frequency for the British telephone service which is typical of the various telephone networks. As shown any information in the form of tonal signals must be transmitted wholly in the frequency band from approximately 900 to 2100 hertz inclusive. The ends of the permissible signal frequency spectrum are bounded by forbidden zones in which the power in the signal must be down, i.e., minus, 20 to 30 dbm. Typical restrictions on data signals in the upper forbidden band, i.e., above 2100 hertz, permit signals of predetermined duration if such signals are always accompanied by signals lying within the range of 900 to 2100 hertz. Similar restrictions for the lower and upper forbidden bands preclude signals having components lying within these forbidden ranges if such signals occasion false operation of trunk signaling apparatus. Thus it can be seen the signal specifications of typical telephone system restricts the allowable tonal frequency range available for the transmission of data signals.

Figure 3:
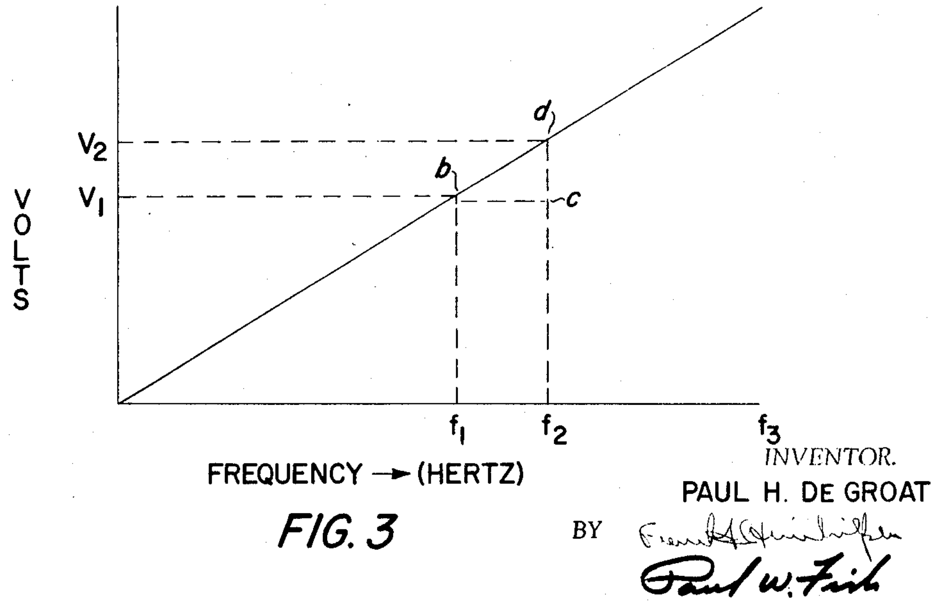
FIG. 3 is a voltage-frequency transfer characteristic curve useful in understanding the operation of the frequency skip circuit in accordance with the principles of the present invention.

Referring now to FIG. 3 there is shown a typical transfer characteristic curve for a voltage controlled modulator utilizable in accordance with the principles of the present invention. As hereinbefore stated, in accordance with the teaching of the hereinabove referenced copending applications, a series of grey scale signal gradations from white to black are converted by means of a voltage controlled oscillator into unique tonal signals suitable for transmission via the acoustic coupler to the telephone network. As discussed hereinabove in conjunction with FIG. 1 the analog video signal emanating from the light responsive detector of the facsimile scanner preferably directly controls the modulator. For example, when scanning the white or background portion of the document, nearly all the image exploring rays are reflected thus resulting in the generation of a maximum signal level from the light responsive detector. Similarly when the image exploring rays fall upon a black or marked portion of the document during a portion of the scanning raster, the majority of the image exploring light rays are absorbed and thus the minimum signal level emanates from the light responsive detector. For grey scale or half tone operation, the voltage signals gradations between the two end points correspond to varying tones of grey and as such characterize the information on the document being scanned.

As shown in the modulator transfer characteristic curve, a voltage $V_1$ in the input signal would correspond to a frequency $f_1$ and similarly a voltage $V_2$ would correspond to a frequency $f_2$. Thus as the essentially analog signal generated by the facsimile scanner in response to variations in document reflectivity is coupled to the voltage controlled oscillator input of the modulator 19, varying frequency signals are generated to uniquely characterize the various information levels in the grey scale which correspond to that portion of the document being scanned.

As hereinbefore described in conjunction with FIG. 2 during the transmission of facsimile tonal signals over ordinary telephone lines, it is often necessary to avoid the transmission of facsimile signals would fall within a predetermined forbidden zone because such data signals would fall within the trunk signaling frequency range and thus could possibly knockdown or disconnect the telephone connection controlled by automatic trunk apparatus. Such a restricted zone may, for example, illustratively lie within the frequency range defined by $f_1$ and $f_2$. Thus the frequency skip circuit as shown in FIG. 1 would be required to distinguish or recognize a signal level falling within the range between $V_1$ and $V_2$ as shown in FIG. 3 and prevent the generation of signals falling within the range defined by $f_1$ and $f_2$.

Figure 4:
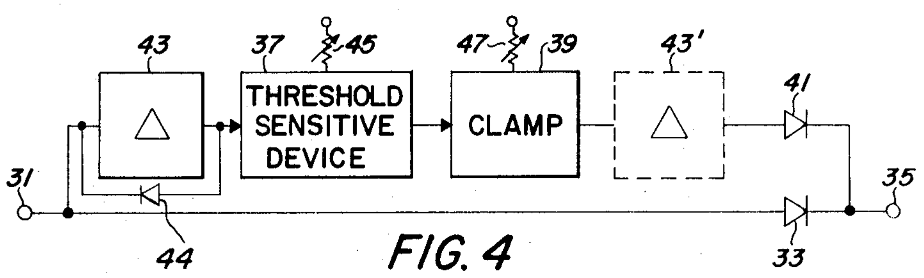
FIG. 4 is a block diagram of the preferred embodiment of the frequency skip circuit in accordance with the principles of the present invention.

Referring now to FIG. 4 there is shown a block diagram of the frequency skip circuit in accordance with the preferred embodiment of the present invention. As shown the analog video signal fromthe facsimile scanner would be coupled to the input terminal 31. For signals lying within the permissible signal frequency band, such analog signals are directly coupled through diode 33 to the output terminal 35. Analog signals appearing at the output terminal 35 would, in normal operation of the facsimile system shown in FIG. 1 be coupled to the voltage controlled oscillator input of modulator 19. Threshold sensitive device 37 is arranged to detect the presence at input terminal 31 of any signal level exceeding $V_1$ which would correspond on the normal transfer characteristic shown in FIG. 3 to a signal frequency in the forbidden range.

In response to the detection by threshold sensitive device 37 of a signal at input terminal 31 which corresponds to a signal frequency in the forbidden range, threshold sensitive device 37 triggers clamp 39. Clamp 39 in the actuated condition couples a step or level output signal via diode 41 which holds the output signal level at terminal 35 at a predetermined voltage level $V_2$ for all signal levels between $V_1$ and $V_2$. With reference to FIG. 3 it may thus be seen that in response to the actuation of the threshold sensitive device 37 a step or skip is introduced into the normal transfer curve. Any voltage slightly greater than $V_1$ would be sufficient to actuate threshold sensitive device 37 which would in turn actuated clamp circuit 39 and thus cause the transfer characteristic to follow the path *bcd* thereby avoiding the generation of frequencies between $f_1$ and $f_2$ which illustratively lie within the forbidden zone. Any voltage greater than $V_2$ would result in generation of a frequency between $f_2$ and $f_3$ in accordance with the normal transfer characteristic. In the preferred embodiment threshold sensitive device 37 and clamp 39 may comprise a Schmitt trigger circuit however any circuit performing the threshold detection and clamp functions separately would be operable.

Referring again to FIG. 3 it may be seen that a delay unit 43 is in series between the input terminal 31 and the input of threshold sensitive device 37. In certain instances it is permissible to transmit data frequency signals shorter than a predetermined time interval which fall within the forbidden frequency zones. In such applications the delay interval of delay circuit 43 would correspond to the permissible length of forbidden frequency signals within the forbidden zone. Thus in operation the threshold sensitive device would not be actuated unless the forbidden signal level at input terminal 31 corresponding to a forbidden signal frequency were present for a time interval greater than a predetermined time interval. Thus the various signals corresponding to the various levels of grey scale falling within the forbidden range would be transmitted if they were not of sufficient duration to interfere with the automatic switching circuitry of the transmission facility. In this manner the high resolution signals would not be automatically rejected, i.e., skipped, however any signals which are of sufficient duration to interfere with the trunk signaling control apparatus would be automatically excluded from the transmitted facsimile signal whenever the threshold sensitive device was actuated in response to a signal of greater than a predetermined time interval. As shown by delay device 43' the delay function may be physically incorporated either in front of threshold device 37 or after the clamp device 39. In the preferred embodiment, the delay means 43 or 43' would be effective only during positive signal excursión within the range defined by $V_1$ and $V_2$. For example, a diode 44 poled as shown could be employed to shunt the delay means during negative excursions of the input signal.

Further as is shown in FIG. 4 the clamp and threshold sensitive devices 37 and 39 have associated therewith potentiometer means 45 and 47 for varying the respective threshold triggering level and output clamp voltage level. In this manner the skip frequency circuit in accordance with the principles of Applicant's invention may be adjusted for operation over a wide range. The range of operation could be calibrated to selectively skip forbidden zones corresponding to particular telephone network specifications. Similarly the delay of delay unit 43 or 43' could be adjustable to permit the generation of signals within the forbidden gap within the tolerance limitations of any particular telephone system.

Figure 5:
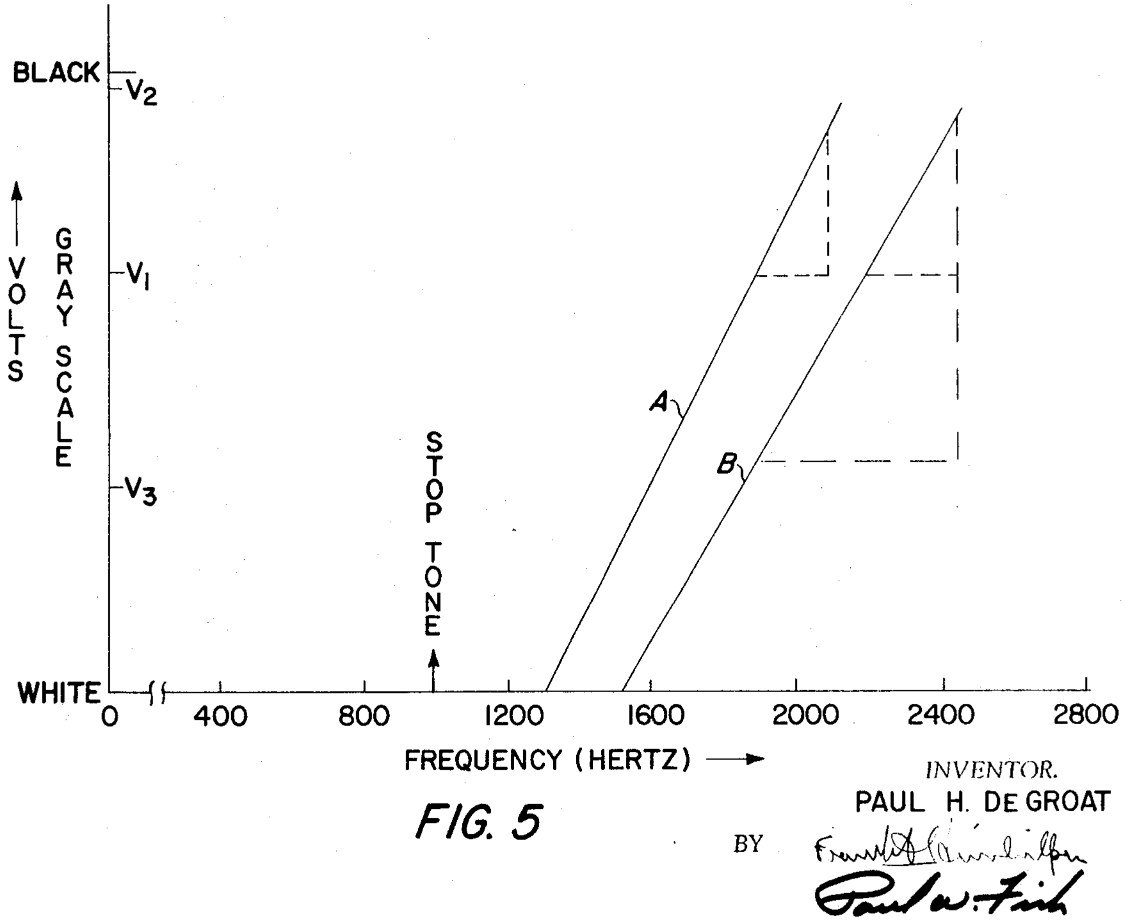
FIG. 5 is a plot of a family of transfer curves useful in understanding the principles of the present invention.

Referring now to FIG. 5 there is shown a family of modulator transfer characteristic curves A and B incorporating therein a single and double frequency skip or jump range respectively in accordance with the principles of the present invention. As shown by curve A, the signaling spectrum for the predetermined values along the grey scale extending from white to black cover the range from 1,300 to 2,150 hertz. In accordance with a first embodiment of the present invention the step or jump between $V'_1$ and $V'_2$ is arranged to exclude the generation of signaling tones within a forbidden gap. The width of the forbidden zone including the necessary guard channel on either side thereof will vary from system to system however in a typical system with the forbidden frequency zone centered at 2,000 hertz, a step or jump from 1,900 to 2,100 hertz is believed to be typical.

Referring now to curve B of FIG. 5 there is shown a double step or jump in accordance with the principles of the present invention. By adjusting the hereinbefore described threshold triggering level to $V'_3$ it is possible to vary the point at which the first jump will be initiated. In this manner as shown in curve B it is possible to selectively insert or extend the jump or skip at either the $V'_1$ or $V'_2$. As hereinbefore described in conjunction with FIG. 3 any signal level above $V'_2$ would be generated in accordance with normal transfer characteristic. Similarly in the normal operation of modulator 19 for video signals below $V'_1$ and $V'_3$ on curves A and B respectively a predetermined frequency is generated for each grey scale level. By selectively setting the respective threshold and output clamp level it is possible to position the step or jump on the curve at any desired point and to extend the guard channels sufficiently to insure proper noninterferring operation of the signaling tones over the transmission channel.

In the foregoing there has been described a novel method and improved facsimile apparatus for selectively excluding facsimile tonal signals from predetermined forbidden zones of landline telephone networks. While the above disclosure has been described in conjunction with a simplex facsimile system, obviously such modifications may be incorporated in a transceiver. Further the frequency skip apparatus in accordance with the principles of the present invention may be selectively controlled by appropriate switching apparatus known to those in the art for providing selective manual or automatic operation thereof. Several frequency skip circuits could be disposed in parallel to provide multiple frequency skip capabilities. The foregoing drawings and description are to be understood as illustrative only and in no sense limiting. Many modifications including the generation of the lower frequency signal $f_1$ in response to the excursion of the video signal into the forbidden zone are intended to be included within the scope of the present invention. Other changes in the structure and operation of the apparatus may be made by those skilled in the art without departing from the spirit of the present invention. It is therefore Applicant's intention to be limited only as indicated by the scope of the appended claims.

What I claim is:

1. A facsimile system operable over a standard commercial telephone transmission facility comprising:

scanning means for generating electric video signals corresponding to the reflectivity along a predetermined scanning raster of a document to be transmitted, modulation means for generating predetermined tonal frequency signals within a predetermined signal spectrum in response to various levels of said video signal, skip frequency means responsive to a predetermined condition in said video signal for preventing the generation of tonal frequency signals lying within a predetermined forbidden frequency band in said predetermined signal spectrum, said skip frequency means comprising threshold sensitive means for detecting signal voltage levels within a predetermined voltage range in said video signal, and clamp means responsive to signals emanating from said threshold sensitive means for generating a predetermined control signal, first coupling means for coupling said tonal signals from said modulation means to an input terminal of said telephone transmission facility, second coupling means for coupling said tonal signals from an output terminal of said telephone transmission facility to a receiver, demodulator means at said receiver responsive to said signals emanating from said second coupling means for generating said recording signals from said tonal signals, and marking means responsive to said recording signals emanating from said demodulator means for reproducing a copy of said document in response thereto.

2. A facsimile system operable over a standard commercial telephone transmission facility comprising:

scanning means for generating electric video signals corresponding to the reflectivity along a predetermined scanning raster of a document to be transmitted, modulation means for generating predetermined tonal frequency signals within a predetermined signal spectrum in response to various level of said video signal, skip frequency means responsive to a predetermined condition in said video signal for preventing the generation of tonal frequency signals lying within a predetermined forbidden frequency band in said predetermined signal spectrum, means for delaying the actuation of said skip frequency means until said predetermined condition in said video signal is detected for at least a predetermined time interval, first coupling means for coupling said tonal signals from said modulation means to an input terminal of said telephone transmission facility, second coupling means for coupling said tonal signals from an output terminal of said telephone transmission facility to a receiver, demodulator means at said receiver responsive to said signals emanating from said second coupling means for generating said recording signals from said tonal signals, and marking means responsive to said recording signals emanating from said demodulator means for reproducing a copy of said document in response thereto.

3. The facsimile system defined in claim 2 additionally including polarity sensitive shunt means for rendering said delay means ineffective during video signal excursions toward a predetermined signal level.

4. A facsimile system operable over a standard commercial telephone transmission facility comprising:

scanning means for generating electric video signals corresponding to the reflectivity along a predetermined scanning raster of a document to be transmitted, modulation means for generating predetermined tonal frequency signals within a predetermined signal spectrum in response to various levels of said video signals, said modulation means including a voltage control oscillator, skip frequency means responsive to a predetermined condition in said video signal for preventing the generation of tonal frequency signals lying within a predetermined forbidden frequency band in said predetermined signal spectrum, and skip frequency means including a Schmitt trigger circuit and diode means for coupling the output of said Schmitt trigger circuit to an input of said voltage control oscillator, first coupling means for coupling said tonal signals form said modulation means to an input terminal of said telephone transmission facility, second coupling means for coupling said tonal signals from an output terminal of said telephone transmission facility to a receiver, demodulator means at said receiver responsive to said signals emanating from said second coupling means for generating said recording signals from said tonal signals, and marking means responsive to said recording signals emanating from said demodulator means for reproducing a copy of said document in response thereto.

5. The method of transmitting tonal facsimile signals over standard telephone lines having predetermined forbidden frequency ranges within a predetermined signal spectrum comprising the steps of:

generating analog video signals corresponding to the variations in the reflectivity along a predetermined scanning raster of a document to be transmitted, generating one of the plurality of discrete unique tonal frequency signals within said predetermined signal spectrum in response to the occurrence of each of a like plurality of signal levels in the analog video signal, monitoring the analog video signals to detect the occurrence of video signal voltage levels within a predetermined range, coupling the tonal frequency signals to the input of a telephone line, and excluding the transmission of predetermined tonal frequency signals falling within said predetermined forbidden frequency ranges within said predetermined spectrum from the tonal frequency signals coupled to the telephone line, said step of excluding the transmission of predetermined tonal signals including the step of delaying the excluding the transmission of said predetermined tonal signals until said video signal voltage levels within said predetermined range have reached a predetermined threshold level.

6. The method of transmitting tonal facsimile signals over standard telephone lines having predetermined forbidden frequency ranges within a predetermined signal spectrum comprising the steps of:

generating analog video signals corresponding to the variations in the reflectivity along a predetermined scanning raster of a document to be transmitted, generating one of a plurality of discrete unique tonal frequency signals within said predetermined signal spectrum in response to the occurrence of each of a like plurality of signal levels in the analog video signal, monitoring the analog video signals to detect the occurrence of video signal voltage levels within a predetermined range, coupling the tonal frequency signals to the input of a telephone line, and excluding the transmission of predetermined tonal signals falling within said predetermined forbidden frequency ranges within said predetermined signal spectrum from the tonal frequency signals coupled to said telephone line, said step of excluding the transmission of predetermined tonal signals including the step of generating a predetermined frequency signal above the forbidden frequency range in response to the detection of an analog signal level within said predetermined voltage range.

PO-1050
(5/69)

UNITED STATES PATENT OFFICE
CERTIFICATE OF CORRECTION

Patent No. 3,591,711 Dated July 6, 1971

Inventor(s) Paul H. DeGroat

It is certified that error appears in the above-identified patent and that said Letters Patent are hereby corrected as shown below:

Claim 2, line 8, "level" should be --levels--.

Claim 4, line 14, before "skip", the word "and" should be --said--.

Claim 5, line 8, before "plurality", the word "the" should be --a--.

Claim 5, line 19, before "spectrum" should be inserted --signal--.

Signed and sealed this 28th day of December 1971.

(SEAL)
Attest:

EDWARD M.FLETCHER,JR.
Attesting Officer

ROBERT GOTTSCHALK
Acting Commissioner of Patents